United States Patent [19]

Cipolli et al.

[11] Patent Number: 5,576,391
[45] Date of Patent: Nov. 19, 1996

[54] AMMONIUM POLYPHOSPHATE MICROENCAPSULATED WITH AMINO-PLASTIC RESINS

[75] Inventors: Roberto Cipolli, Novara; Roberto Oriani, Milan; Enrico Masarati, Piacenza; Gilberto Nucida, Milan, all of Italy

[73] Assignee: Ministero Dell'Universita' E Della Ricerca Scientifica E Tecnologica, Rome, Italy

[21] Appl. No.: 460,696

[22] Filed: Jun. 2, 1995

Related U.S. Application Data

[63] Continuation of Ser. No. 976,319, Nov. 13, 1992, abandoned.

[30] Foreign Application Priority Data

Nov. 14, 1991 [IT] Italy .................... MI91A3042

[51] Int. Cl.$^6$ .............. C08F 8/00; C08L 81/00; C08L 85/02
[52] U.S. Cl. ............. 525/150; 525/158; 528/230
[58] Field of Search ............ 525/158, 150; 528/230

[56] References Cited

U.S. PATENT DOCUMENTS

| | | | |
|---|---|---|---|
| 4,157,983 | 6/1979 | Golden | 252/316 |
| 4,698,215 | 10/1987 | Albanesi et al. | 423/274 |

FOREIGN PATENT DOCUMENTS

| | | |
|---|---|---|
| 0014463 | 8/1980 | European Pat. Off. . |
| 0178564 | 4/1986 | European Pat. Off. . |
| 0180795 | 5/1986 | European Pat. Off. . |
| 0193793 | 9/1986 | European Pat. Off. . |
| 0326082 | 8/1989 | European Pat. Off. . |
| 0415371A2 | 6/1991 | European Pat. Off. . |
| 0448774 | 10/1991 | European Pat. Off. . |
| 01198685 | 8/1989 | Japan . |
| 1286661 | 8/1972 | United Kingdom . |

OTHER PUBLICATIONS

Ullmann's Encyclopedia of Industrial Chemistry, 5th Edition, vol. A 16, 1990, p. 582.

*Primary Examiner*—Nathan M. Nutter
*Attorney, Agent, or Firm*—Oblon, Spivak, McClelland, Maier & Neustadt, P.C.

[57] ABSTRACT

Ammonium polyphosphate having the general formula (I):

$$(NH_4)_{n+2}P_nO_{3n+1} \qquad (I)$$

microencapsulated with condensation compounds obtained by means of the polymerization of polyaminic compositions essentially constituted by derivatives of 2,4,6-triamino-1,3, 5-triazine, having the general formula (II):

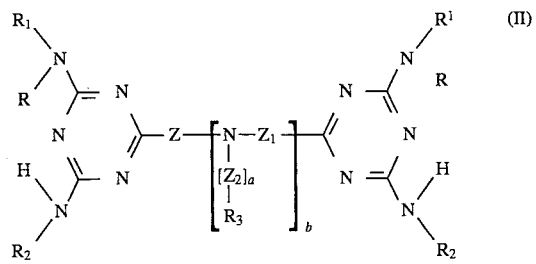

with aldehydes, preferably formaldehyde.

9 Claims, No Drawings

AMMONIUM POLYPHOSPHATE MICROENCAPSULATED WITH AMINO-PLASTIC RESINS

This application is a Continuation of application Ser. No. 07/976,319, filed on Nov. 13, 1992, now abandoned.

The present invention relates to a composite constituted by ammonium polyphosphate microencapsulated with aminoplastic resins obtained by polymerizing polyaminic compositions, essentially constituted by malaminic derivatives, with aldehydes.

More particularly, the present invention relates to ammonium polyphosphate microencapsulated with aminoplastic resins obtained by polymerizing with aldehydes, preferably formaldehyde, derivatives of 2,4,6-triamino-1,3,5-triazine.

Said compounds are able to endow thermoplastic polymers, or polymers with elastomeric properties, in particular olefinic polymers or copolymers, with high characteristics of self-extinguishment in the presence of a flame.

In particular, the subject matter of the present invention is a composite constituted by ammonium polyphosphate having the general formula (I):

$$(NH_4)_{n+2}P_nO_{3n+1} \quad (I)$$

wherein n stands for an integer comprised within the range of from 2 to 800, preferably of from 5 to 500, microencapsulated with 10–80% by weight f a resin obtained by polymerizing with aldehydes a mixture comprising:

(a) from 0 to 50 parts by weight of one or more polyaminic derivatives;

(b) from 50 to 100 parts by weight of one or more derivatives of 2,4,6-triamino-1,3,5-triazine having the general formula (II):

wherein:
the radicals from R to $R_2$, which may be the same, or different from each other, and which may have different meanings on each triazinic ring, are:
H; $C_1$–$C_{18}$ alkyl; $C_2$–$C_8$ alkenyl; $C_6$–$C_{16}$ cycloalkyl or alkylcycloalkyl, possibly substituted with a hydroxy or $C_1$–$C_4$ hydroxyalkyl function;

$$CH_2-[-C_mH_{2m}-]-O-R_4$$

$$CH_2-[-C_pH_{2p}-]-N(R_5)_2$$

wherein:
—m=an integer comprised within the range of from 1 to 7;
p=an integer comprised within the range of from 1 to 5;
$R_4$=H; $C_1$–$C_8$ alkyl; $C_2$–$C_6$ alkenyl; $-[-C_qH_{2q}-]-O-R_6$ wherein q is an integer comprised within the range of from 1 to 4 and $R_6$ is H or $C_1$–$C_4$ alkyl; $C_6$–$C_{12}$ cycloalkyl or alkylcycloalkyl;
the radicals $R_5$, which may be the same, or different from each other, are:

H, $C_1$–$C_8$ alkyl; $C_2$–$C_6$ alkenyl; $C_6$–$C_{12}$ cycloalkyl or alkylcycloalkyl; $C_1$–$C_4$ hydroxyalkyl;
or the moiety:

$$-N\begin{matrix}R_5\\R_5\end{matrix}$$

is replaced by a heterocyclic radical linked to the alkyl chain through the nitrogen atom, and possibly containing another heteroatom preferably selected from O, S, N;

or in the general formula (II) the moiety:

$$-N\begin{matrix}R\\R_1\end{matrix}$$

is replaced by a heterocyclic radical linked to the triazinic ring through the nitrogen atom, and possibly containing another heteroatom preferably selected from O, S, N;

a is 0 (zero) or 1;

b is 0 (zero) or an integer comprised within the range of from 1 to 5;

$R_3$ is hydrogen or:

and its meaning may vary within each repeating unit; when b is 0 (zero), Z is a divalent radical falling within the scope of one of the following formulas:

$$\begin{matrix}R_7 & R_7\\-N & N-\\R_7 & R_7\end{matrix} \quad (III)$$

wherein the radicals $R_7$, which may be the same or different from each other, are hydrogen or $C_1$–$C_4$;

$$-\underset{R_8}{N}-[C_rH_{2r}]-\underset{R_8}{N}-; \quad (IV)$$

$$-\underset{R_8}{N}-[C_rH_{2r-r}]-\underset{R_8}{N}-; \quad (V)$$

wherein r is an integer comprised within the range of from 2 to 14; $R_8$ is hydrogen; $C_1$–$C_4$ alkyl; $C_2$–$C_6$ alkenyl; $C_1$–$C_4$ hydroxyalkyl;

$$-\overset{H}{N}+CH_2\frac{}{\jmath_s}O+CH_2\frac{}{\jmath_s}\overset{H}{N}- \quad (VI)$$

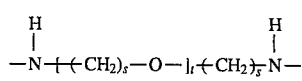  (VII)

wherein s is an integer comprised within the range of from 2 to 5 and t is an integer comprised within the range of from 1 to 3;

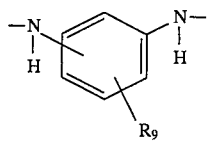  (VIII)

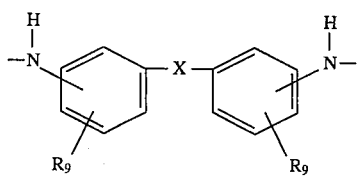  (IX)

wherein:

X is a direct bond C—C;O; S; S—S; SO; $SO_2$; NH; $NHSO_2$; NHCO; N=N; $CH_2$;

$R_9$ is hydrogen; hydroxy; $C_1$–$C_4$ alkyl; $C_1$–$C_4$ alkoxy;

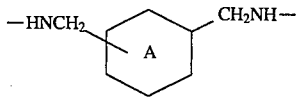  (X)

wherein A may be a saturated or unsaturated ring;

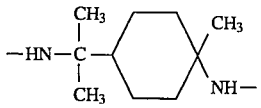  (XI)

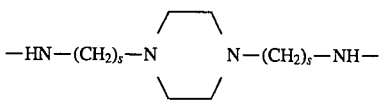  (XII)

wherein s has the above defined meaning;

when, on the contrary, b is an integer comprised within the range of from 1 to 5, the moiety:

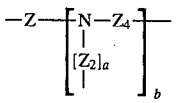

is a multivalent moiety falling within the scope of one of the following formulas:

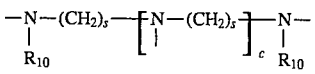  (XIII)

wherein:

$R_{10}$ is hydrogen or $C_1$–$C_4$;

c is an integer comprised within the range of from 1 to 5;

the indexes s, which may be the same, or different from each other, have the same meaning as defined hereinabove;

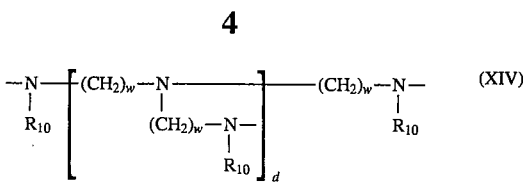  (XIV)

wherein:

$R_{10}$ has the meaning as defined hereinabove;

w is an integer comprised within the range of from 2 to 4;

d is either 1 or 2.

According to a preferred form of practical embodiment of the composite according to the present invention, the polyaminic derivative is selected from compounds containing the 1,3,5-triazine ring, or at least one moiety >C=O and/or >C=S.

Also those derivatives having an asymmetrical structure, in the sense that the radicals R, $R_1$ and $R_2$ may have different meanings on each triazinic ring, fall within the scope of general formula (II).

The (a) and (b) components shall be selected in such a way as to secure a high level of crosslinking with the aldehydes, in order to maximize the microencapsulation of ammonium polyphosphate and consequently reduce its water solubility down to very low values.

Preferably, the aldehyde is formaldehyde or a mixture containing formaldehyde and, up to 20% by mol, another aldehyde with general formula (XV):

$R_{11}$—CHO  (XV)

wherein $R_{11}$ is $C_1$–$C_8$ alkyl; $C_2$–$C_6$ alkenyl, $C_6$–$C_{12}$ cycloalkyl; $C_6$–$C_{12}$ aryl.

However, formaldehyde is the preferred aldehyde.

Examples of ammonium polyphosphate of general formula (I) are:

ammonium pyrophosphate, ammonium tripolyphosphate, commercial ammonium polyphosphate, such as, for example, those respectively known under the marks "Exolit 422" (manufactured and marketed by Hoechst) and "Phos-Chek P/40" (Monsanto Chemical).

Examples of radicals from R to $R_2$ in general formula (II) are:

methyl; ethyl; propyl; isopropyl; n-butyl; isobutyl; tert-butyl; n-pentyl; isopentyl; n-hexyl; tert-hexyl; octyl; tert-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylamino) ethyl; 3-(N,N-dimethylamino) propyl; 4-(N,N-diethylamino) butyl; 5-(N,N-diethylamino) pentyl; 5-(N,N-diisopropylamino) pentyl; 3-(N-ethylamino) propyl; 4-(N-methylamino) butyl; 5-(N,N-diethylamino) pentyl; 3-(N-ethylamino) propyl; 4-(N-methylamino) butyl; 4-(N,N-dipropylamino) butyl; 2-(N,N-diisopropylamino) ethyl; 6-(N-hexenylamino) hexyl; 2-(N-ethenylamino) ethyl; 2-(N-cyclohexylamino) ethyl; 2-(N-2-hydroxyethylamino) ethyl; 2-(2- hydroxyethoxy) ethyl; 2-(2-methoxyethoxy) ethyl; 6-(N-propylamino) hexyl; and so forth.

Examples of heterocyclic radicals which may replace the moiety:

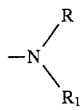

in general formula (II) are: aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; and so forth.

Examples of heterocyclic radicals which may replace the moiety:

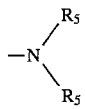

are:

aziridine; pyrrolidine; piperidine; morpholine; thiomorpholine; piperazine; 4-methylpiperazine; 4-ethylpiperazine; and so forth.

Examples of divalent —Z— radicals are those which derive, by elimination of a hydrogen atom from each aminic moiety, from the following diaminic compounds: piperazine; 2-methyl piperazine; 2,5-dimethylpiperazine; 2,3,5,6-tetramethyl piperazine; 2-ethylpiperazine; 2,5-diethyl piperazine; 1,2-diaminoethane; 1,3-diaminopropane; 1,4-diaminobutane; 1,5-diaminopentane; 1,6-diaminohexane; 1,8-diaminooctane; 1,10-diaminodecane; 1,12-diaminododecane; N,N-dimethyl-1,2-diaminoethane; N-methyl-1,3-diaminopropane; N-ethyl-1,2-diaminoethane; N-isopropyl-1,2-diaminoethane; N-(2-hydroxyethyl)-1,2-diaminoethane; N,N'-bis-(2-hydroxyethyl)-1,2-diaminoethane; N-(2-hydroxyethyl)-1,3-diaminopropane; N-hexenyl-1,6-diaminohexane; N,N'-diethyl-1,4-diamino-2-butene; 2,5-diamino-3-hexene; 2-aminoethyl ether; (2-aminoethoxy) methylether; 1,2-bis -(2-aminoethoxy) ethane; 1,3-diaminobenzene; 1,4-diaminobenzene; 2,4-diaminotoluene; 2,4-diaminoanisole; 2,4-diaminophenol; 4-aminophenylether; 4,4'-methylenedianiline; 4,4'-diaminobenzanilide; 3-aminophenylsulfone; 4-aminophenylsulfone; 4-aminophenylsulfoxide; 4-aminophenyldisulfide; 1,3-bis (aminomethyl)-benzene; 1,4-bis (aminomethyl)-benzene; 1,3-bis (aminomethyl) cyclohexane; 1,8-diamino-p-mentane; 1,4-bis (2-aminoethyl) -piperazine; 1,4-bis (3-aminopropyl)-piperazine; 1,4-bis (4-bis (4-aminobutyl)-piperazine; 1,4-bis (5-aminopentyl)-piperazine; and so forth.

Examples of multivalent radicals:

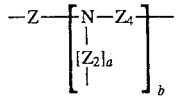

are those which derive, by elimination of a hydrogen atom from each reacted amino group, from the following polyaminic compounds:

bis (2-aminoethyl) amine; bis (3-aminopropyl) amine; bis (4-aminobutyl) amine; bis (5-aminopentyl) amine; bis [2-(N-methylamino)-ethyl]-amine; 2-N-butyl-bis (2-aminoethyl) amine; bis [3-(N-methylamino) propyl] -amine; N-(3-aminopropyl)-1,4-diamonobutane; N-(3-aminopropyl)-1,5-diaminopentane; N-(4-aminobutyl)-1,5-diaminopentane; tris (2-aminoethyl) amine; tris (3-aminopropyl) amine; tris (4-aminobutyl) amine; tris [2-(N-ethylamino) ethyl]amine; N,N'-bis (2-aminoethyl)-1,2-diaminoethane; N,N'-bis (3-aminopropyl)-1,3-diaminopropane; N,N'-bis (2-aminoethyl)-1,3-diaminopropane; N,N'-bis (3-aminopropyl)-1,2-diaminoethane; N,N'-bis (3-aminopropyl)-1,4-diaminobutane; bis [2-(2-aminoethyl) aminoethyl] amine; N,N'-bis [2-(2-aminoethyl) aminoethyl]-1,2-diaminoethane; N,N'-bis [3-(2-aminoethyl) aminopropyl]-1,2-diaminoethane; N,N,N',N'-tetrakis (2-aminoethyl)-1,2-diaminoethane; and so forth.

Examples of polyaminic derivatives are:

urea; ethyleneurea; thiourea; ethylenethiourea; propyleneurea; melamine; acetoguanamine; propionoguanamine; butyroguanamine; isobutyroguanamine; caprinoguanamine; succinoguanamine; benzoguanamine; metamethylbenzoguanamine; benzylguanamine; hydantoin; piperazine-2,5-dione; barbituric acid; and so forth.

By "formaldehyde", as this term is used in the instant disclosure and in the appended claims, any forms are meant, in which formaldehyde is usually marketed: aqueous solution, metaformaldehyde, paraformaldehyde.

Examples of radicals $R_{11}$ are:

methyl; ethyl; n-propyl; n-butyl; n-hexyl; n-octyl; ethenyl; propenyl; cyclohexyl; phenyl; and so forth.

The composites according to the present invention can be synthetized as follows:

(i) by reacting in solution, with a suitable solvent (such as, e.g., methyl alcohol, ethyl alcohol, water or their mixtures, and so forth), the derivative of 2,4,6-triamino-1, 3,5-triazine having the general formula (II), either mixed or not mixed with the polyaminic derivative, with aldehydes. The molar ratio of the triazinic derivative of general formula (II), or of its mixture with the polyaminic derivative, to the aldehydes, is comprised within the range of from 1:1 to 1:12.

The reaction is carried out at a pH value comprised within the range of from 7 to 12, possibly obtained by adding an alkali (such as, for example, potassium carbonate, sodium carbonate, sodium hydroxide, and so forth), at temperatures comprised within the range of from 20° C. to solvent boiling point. A finely subdivided dispersion is obtained;

(ii) causing the resulting reaction product to turn into a resin by feeding it onto a dispersion of ammonium polyphosphate having the general formula (I), in finely subdivided form, with particle size smaller than 70 micrometers, in a liquid of the above mentioned type having a pH value comprised within the range of from 1 to 5, and heated at a temperature of from 40° C. to 150° C. pH values comprised within the range of from 1 to 5 can be obtained by possibly adding an acid (such as, e.g., sulfuric acid, hydrochloric acid, phosphoric acid, and so forth) to said dispersion. The resulting mixture is kept further stirred at the selected temperature, during the necessary time to complete the resinification and microencapsulation process, preferably of from 1 to 12 hours. The resulting product, constituted by microencapsulated ammonium polyphosphate, is filtered off.

The composite is first dried at 100° C., then is submitted to thermal treatment for some hours, preferably from 1 to 3 hours, in a vacuum oven at 150° C.

Generally, a good quality composite is obtained as a white crystalline powder, with a distribution of particle size substantially identical to the particle size distribution of ammonium polyphosphate used.

Possibly present agglomerates of material are easily broken without causing the particle coating to be fractured.

The composite according to the present invention can be used in self-extinguishing polymeric compositions without any further treatments.

The effectiveness of ammonium polyphosphate microencapsulation is evaluated by measuring the solubility of the obtained composite in water at 60° C., according to a process disclosed in the following.

An alternative synthesis route consists in causing the reactions of steps (i) and (ii) to take place as one single step, at a pH value comprised within the range of from 1 to 5, and at a higher temperature than 40° C.

Many of derivatives of 2,4,6-triamino-1,3,5-triazine with general formula (II) are known; they can anyway be easily synthetized according to as disclosed in European Patent application publication No. 415,371, to the same Applicant's name.

Composites constituted by ammonium polyphosphate with general formula (I) microencapsulated with 10–80% by weight of a resin obtained by means of the polymerization of triazinic derivatives of general formula (II), either containing or not containing the polyaminic derivatives, with formaldehyde only, not mentioned in the examples, are those as reported in Table 1, in which $R_3$, when present, is substituted by the triazinic ring of formula:

TABLE 1

Derivative of general formula (I)

$$\begin{array}{c} R_1 \quad R \quad H \quad R_2 \\ N \quad N \quad N \\ | \quad \| \quad | \\ \text{(triazine ring)} \end{array}$$

$$-Z-\left[N-Z_1\atop |\atop Z_{2,a}\right]_b$$

| COMPOUND N° | R—N—R₁ | | R₂ | Derivative -Z-[N-Z₁/Z₂,a]ᵦ | Polyaminic derivative Parts by weight | Polyaminic derivative Designation | Polyaminic derivative Parts by weight | Molar ratio amines/formaldehyde | Ratio by weight APP/resin |
|---|---|---|---|---|---|---|---|---|---|
| 1 | H | H | H | –N⌐N– (piperazine) | 85 | Aceto-guanamine | 15 | 1:8.0 | 3.2:1 |
| 2 | H (N—CH₃ piperazine) | H | H | N(CH₂CH₂NH–)₃ | 100 | — | 1:7.4 | 4.6:1 | |
| 3 | H | H | H | –N⌐N– (piperazine) | 60 | Melamine | 40 | 1:9.0 | 2.7:1 |
| 4 | H | H | H | –HN–C₆H₄–CONH–C₆H₄–NH– | 100 | — | — | 1:45 | 2.55:1 |
| 5 | (morpholine, N–O) | H | H | –HN(CH₂)₆NH– | 55 | Melamine | 45 | 1:6.5 | 3.0:1 |
| 6 | H | H | H | –N⌐N– (piperazine) | 100 | — | — | 1:4.0 | 2.9:1 |

TABLE 1-continued

Derivative of general formula (I)

$$\begin{array}{c} R_1 \\ | \\ R-N \quad R \\ \diagdown \diagup \\ N \\ \| \\ N \quad N \\ \diagup \quad \diagdown \\ \| \quad H \\ N \quad N-R_2 \\ \diagdown \diagup \\ \end{array}$$

$-Z-\left[N-Z_1\atop |\atop Z_{2,a}\right]_b$

| COMPOUND N° | R—N—R₁ | R₂ | $-Z-\left[N-Z_1 \atop Z_{2,a}\right]_b$ | Parts by weight | Polyaminic derivative Designation | Parts by weight | Molar ratio amines/formaldehyde | Ratio by weight APP/resin |
|---|---|---|---|---|---|---|---|---|
| 7 | ⟨piperidine⟩ | H | —HN(CH₂)₂—N—(CH₂)₂NH— | 70 | Melamine | 30 | 1:8.0 | 2.2:1 |
| 8 | n-C₄H₉ | H | ⟨piperazine⟩ | 100 | — | — | 1:3.8 | 3.25:1 |
| 9 | ⟨thiomorpholine⟩ | H | ⟨piperazine⟩ | 63 | Melamine | 37 | 1:4.8 | 1.5:1 |
| 10 | CH₂CH₂OH | H | ⟨piperazine⟩ | 100 | — | — | 1:9.0 | 2.1:1 |
| 11 | ⟨morpholine⟩ | H | —HNCH₂—⟨cyclohexane-CH₂NH—⟩ | 60 | Melamine | 40 | 1:7.5 | 3.0:1 |
| 12 | (CH₂)₃OCH₃ | H | ⟨piperazine⟩ | 100 | — | — | 1:4.0 | 2.25:1 |

TABLE 1-continued

Derivative of general formula (I)

$$-Z-[-N-Z_1-]_b$$
$$\quad\quad\quad Z_{2a}$$

| COMPOUND N° | R—N—R₁ | R | R₂ | Parts by weight | Polyaminic derivative Designation | Parts by weight | Molar ratio amines/formaldehyde | Ratio by weight APP/resin |
|---|---|---|---|---|---|---|---|---|
| 13 | (CH₂)₃N—morpholine | H | H | 100 | — | — | 1:3.8 | 2.85:1 |
| 14 | CH₂CH₂OH | CH₃ | H | 68 | Melamine | 32 | 1:4.5 | 2.1:1 |
| 15 | (CH₂)₂O(CH₂)₂OH | H | H | 100 | — | — | 1:5.2 | 2.5:1 |
| 16 | CH₂CH₂OCH₃ | H | H | 100 | — | — | 1:6.0 | 2.75:1 |
| 17 | morpholine | H | H | 62 | Melamine | 38 | 1:8.0 | 3.0:1 |
| 18 | H | H | H | 80 | Succino-guanamine | 20 | 1:5.5 | 2.8:1 |

Z column (piperazine/other rings per compound):
- 13: piperazine
- 14: piperazine
- 15: piperazine
- 16: —NCH₂CH₂N—, CH₃/CH₃
- 17: p-phenylenediamine (—HN—C₆H₄—NH—)
- 18: piperazine TABLE 1-continued Derivative of general formula (I)

$$\begin{array}{c} R_1 \\ | \\ R-N \\ \diagdown \\ C=N \\ / \\ N \\ \diagup \\ \diagdown \end{array} \quad \begin{array}{c} R \\ | \\ N \\ \| \\ C \\ / \\ \diagdown \end{array} \quad \begin{array}{c} H \\ | \\ N \\ \diagdown \\ C \\ / \\ \diagup \end{array} \quad \begin{array}{c} R_2 \\ | \\ N \\ / \\ \diagdown \end{array}$$

$$-Z-\left[N-Z_1\atop|\atop Z_{2_a}\right]_b$$

| COMPOUND N° | R—N—R₁ | R₂ | -Z-[N-Z₁(Z₂ₐ)]ᵦ | Parts by weight | Polyaminic derivative Designation | Parts by weight | Molar ratio amines/formaldehyde | Ratio by weight APP/resin |
|---|---|---|---|---|---|---|---|---|
| 19 | morpholine (N-CH₂-CH₂-O-CH₂-CH₂) | H | —NCH₂CH₂NH / CH₂CH₂OH | 64 | Melamine | 36 | 1:3.5 | 2.5:1 |
| 20 | H, H | H | —HN(CH₂)₃N[piperazine]N(CH₂)₃NH— | 100 | — | — | 1:6.0 | 2.7:1 |
| 21 | H, H | H | CH₃-substituted piperazine bis | 81 | Benzo-guanamine | 19 | 1:5.2 | 4.75:1 |
| 22 | CH₂CH₂OCH₃ | H | N(CH₂CH₂NH—)₃ [piperazine] | 70 | Melamine | 30 | 1:7.4 | 2.5:1 |
| 23 | (CH₂)₅OH | H | piperazine —N⟨⟩N— | 100 | — | — | 1:3.2 | 2.6:1 |
| 24 | pyrrolidine | H | piperazine —N⟨⟩N— | 67 | Melamine | 33 | 1:6.5 | 4.0:1 |

TABLE 1-continued

Derivative of general formula (I)

$$\begin{array}{c} R_1 \\ | \\ R-N \\ \diagdown \\ N \\ \diagup \\ N \\ \diagdown \\ N \\ \diagup \\ \diagdown \\ N-Z_1 \\ \diagdown \\ Z_{2,a} \end{array}\right]_b$$

| COMPOUND N° | R—N—R₁ | R₂ | —Z—[N—Z₁—Z₂,ₐ]ᵦ | Parts by weight | Designation | Parts by weight | Molar ratio amines/formaldehyde | Ratio by weight APP/resin |
|---|---|---|---|---|---|---|---|---|
| 25 | piperazine (N—H) | H | —NH(CH₂)₃NH— | 78 | Melamine | 22 | 1:5.0 | 1.8:1 |
| 26 | CH₂CH₂OCH₃ | H | (cyclohexyl with CH₃, CH₃, NH—, HN—C(CH₃)₂ substituents) | 100 | — | — | 1:4.4 | 2.75:1 |
| 27 | morpholine | H | —HN(CH₂CH₂O)₂—CH₂CH₂NH— | 69 | Melamine | 31 | 1:3.5 | 2.9:1 |
| 28 | C₂H₅, C₂H₅ | H | piperazine (N—) | 100 | — | — | 1:4.0 | 3.0:1 |
| 29 | H | H | piperazine (N—) | 82 | Piperazine-2,5-dione | 18 | 1:6.5 | 2.5:1 |
| 30 | H | H | —HN(CH₂)₂—N—(CH₂)₂NH— | 65 | Benzyl-guanamine | 35 | 1:8.2 | 3.5:1 |

TABLE 1-continued

Derivative of general formula (I)

| COMPOUND N° | R—N—R₁ | R₂ | $-Z-\left[\begin{array}{c}N-Z_1\\|\\Z_2\end{array}\right]_b-$ | Parts by weight | Polyaminic derivative Designation | Parts by weight | Molar ratio amines/formaldehyde | Ratio by weight APP/resin |
|---|---|---|---|---|---|---|---|---|
| 31 | (CH₂)₃N(C₂H₅)₂ | H | 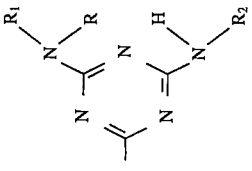 | 59 | Melamine | 41 | 1:6.5 | 3.2:1 |
| 32 | morpholine (N-CH₂CH₂-O-CH₂CH₂) | H | —N—CH₂—CH=CH—CH₂—N—<br>    \|                       \|<br>   C₂H₅                C₂H₅ | 64 | Melamine | 36 | 1:5.3 | 2.7:1 |
| 33 | CH₂CH₂OCH₃ | H | —HNCH₂—CH₂NH— | 100 | — | — | 1:4.4 | 2.8:1 |
| 34 | H | H | —HN(CH₂)₃—N—(CH₂)₃NH—<br>                     \| | 100 | — | — | 1:7.6 | 4.2:1 |

APP = Exolit 422® ammonium polyphosphate (ex Hoechst)

The examples disclosed in the following illustrate the features of the invention without limiting them.

As mentioned hereinabove, the effectiveness of the process for ammonium polyphosphate microencapsulation is evaluated by measuring the solubility in water at 60° C. of the resulting product, according to the following process.

A number of grammes of composite according to the present invention are weighted, which are equal to:

$$\frac{10}{APP\,\%} \times 100$$

wherein:

APP % is the value of the percent content, by weight, of ammonium polyphosphate contained in the composite obtained in the examples disclosed in the following (and determined by means of elemental analysis for phosphorus content), and are charged, together with 100 cm³ of distilled water, to a reactor of 0.25 liter equipped with stirrer, thermometer, reflux condenser and heating bath.

The dispersion is heated to 60° C., and is kept at that temperature value for 20 minutes, then the dispersion is centrifuged for 45 minutes.

Subsequently, 5 cm³ of clear liquid phase is drawn and is dried in an oven at 120° C.

The solubility of ammonium polyphosphate, expressed as g/100 g of water, is calculated from the weight of the residue (APP).

A further confirmation of the encapsulation degree achieved is obtained by analysing the obtained products by scanning electron microscopy, with a CAMBRIDGE STEREOSCAN 200 model SEM, which makes it possible, besides crystal size, the type and amount to be evaluated of resin coating deposited on ammonium polyphosphate crystals.

EXAMPLE 1

184.5 g of cyanuric chloride and 1300 cm³ of methylene chloride are charged to a reactor of 3 liters of capacity, equipped with stirring means, thermometer, addition funnel, refluxing condenser and cooling bath.

With cooling from the outside, 75 g of 2-methoxy ethyl amine and 40 g of sodium hydroxide dissolved in 150 cm³ of water are added simultaneously, within a 3 hour time,

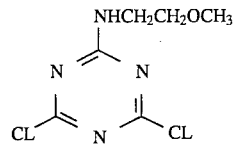

with the pH value of the mixture being kept comprised within the range of from 5 to 7, and the temperature being kept comprised within the range of from 0° to 3° C.

The reaction mixture is kept at said temperature of 0°–3° C. for a further 3 hours, then the aqueous phase is separated.

The organic solution is treated with two portions, of 200 cm³ each, of water, with the aqueous phase being separated each time.

By distillation of methylene chloride, 217.5 g of intermediate (XVI):

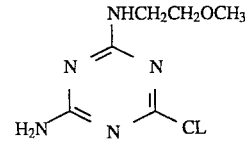

are obtained as a white crystalline powder with m.p.= 73°–75° C. (m.p.=melting point) and a chlorine content of 31.68% (theoretical chlorine content: 31.84%). 400 cm³ of acetone and 133.8 g intermediate (XVI) are charged to a reactor of 1 liter of capacity equipped with stirring means, thermometer, addition funnel, refluxing condenser and heating bath.

The reaction mixture is heated up to 40° C. with stirring, until a solution is obtained, then, with temperature being kept constant at 40° C., 102 g of an aqueous solution of ammonia at 30% by weight are added during a 30 minute time.

The reaction mixture is subsequently heated up to 45° C., and is kept 4 hours at that temperature.

After cooling down to 10° C., the resulting product is filtered off and is washed on the same filter with cold water.

After oven drying at 100° C., 114 g of intermediate (XVII):

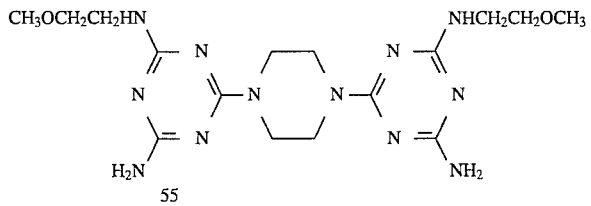

are obtained as a white crystalline powder having m.p.= 195°–197° C., and a chlorine content of 17.18% (theoretical chlorine content: 17.44%).

500 cm³ of xylene, 81.4 g of intermediate (XVII) and 17.2 g of piperazine are charged to the same reactor of 1 liter of capacity.

The resulting mixture is heated up to 100° C. and is kept 2 hours at that temperature.

Then 16 g of sodium hydroxide are added and the temperature of the reaction mixture is increased up to boiling temperature. The reaction mixture is kept refluxing for approximately 20 hours, then is cooled down to room temperature, and the resulting precipitate is filtered off.

The filter cake is washed with a plentiful water and is dried.

74.2 g of intermediate (XVIII):

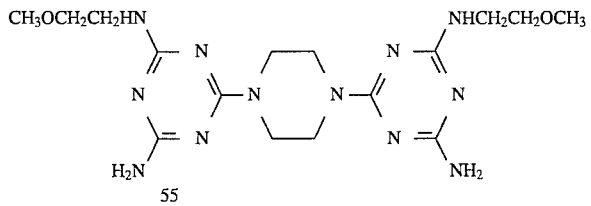

with m.p.=212°–215° C. are obtained.

The structure of intermediates (XVI), (XVII) and (XVIII) was confirmed by I.R. spectroscopic analysis.

100 cm³ of water, 130 cm³ of methanol, 0.7 g of potassium carbonate, 48.6 g of an aqueous solution at 37% by weight of formaldehyde and, with stirring, 33.6 g of intermediate (XVIII) are charged to a reactor of 0.5 liter of capacity, equipped as the preceding one.

The reaction mass is heated up to 70° C. for 30 minutes, until a good dispersion is obtained.

Such a dispersion, kept at the temperature of 70° C., is fed, during 30 minutes, to the same 1 liter reactor as disclosed hereinabove, containing a sospension constituted by 90 g of ammonium polyphosphate [Exolit 422®, with a phosphorus content of 31.4% ] 120 cm³ of water and 120 cm³ of methanol, heated at 70° C.

The resulting mixture is heated to boiling temperature and is kept refluxing for 10 hours.

The reaction mixture is allowed to cool down to room temperature, and the resulting product is filtered off, with the filter cake being washed with a water-methanol mixture.

By drying the filter cake in an oven at 100° C., and subsequently submitting it to a heat treatment at 150° C. for 3 hours under vacuum, 120 g of a white crystalline product are obtained, which contains 22.4% of phosphorus, corresponding to a content of 71.3% by weight of ammonium polyphosphate.

The obtained product corresponds hence to ammonium polyphosphate microencapsulated with resin in a ratio of 2.48:1 by weight.

The solubility of thus encapsulated ammonium polyphosphate in water at 60° C. is of 10.4% by weight.

The solubility of Exolit® 422 in water at 60° C. is higher than 65% by weight.

EXAMPLE 2

184.5 g of cyanuric chloride and 1300 cm³ of methylene chloride are charged to the same equipment of 3 liters of capacity as disclosed in Example 1.

Then, proceeding as disclosed in Example 1, but using 87.2 g of morpholine, 230 g of intermediate (XIX):

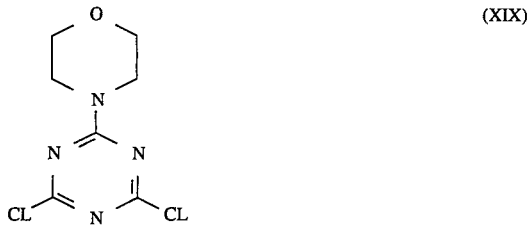

are obtained as a white crystalline powder with m.p.= 155°–157° C. and a chlorine content of 29.87% (theoretical value: 30.12%).

100 g of a solution at 30% by weight of ammonia, 100 cm³ of water and 70.5 g of intermediate (XIX) are charged to a reactor of 0.5 liter of capacity, equipped as in Example 1.

The reaction mixture is heated up to 50° C. and is kept 7 hours at this temperature; the reaction mixture is allowed to cool down to room temperature, the obtained product is filtered off and the filter cake is washed with water.

By drying the filter cake, 58 g of intermediate (XX):

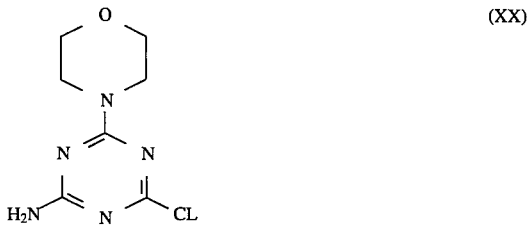

are obtained as a white crystalline powder with m.p.= 189°–191° C. and a chlorine content of 16.28% (theoretical value: 16.47%).

400 cm³ of ortho-dichlorobenzene, 53.9 g of intermediate (XX) and 10.8 g of piperazine are added to a reactor of 1 liter of capacity, fitted as the one disclosed hereinabove.

The resulting mixture is heated up to 100° C., and is kept 2 hours at that temperature. Then, 10 g of sodium hydroxide are added and the resulting mixture is heated up to 140° C. The reaction mixture is kept 16 hours at 140° C., then is cooled down to room temperature and the resulting product is filtered off and the filter cake is washed with plentiful water.

After drying, 53.0 g of intermediate (XXI):

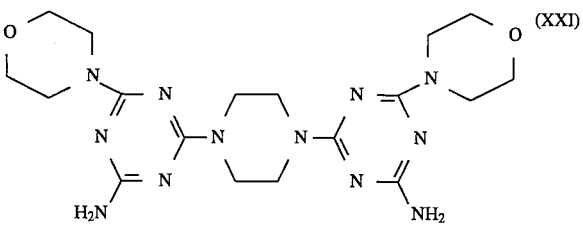

is obtained as a white crystalline powder having m.p.= 280°–285° C.

The structure of compounds (XIX), (XX) and (XXI) was confirmed by I.R. spectroscopic analysis.

70 cm³ of water, 0.5 g of sodium carbonate, 120 cm³ of methanol, 77.0 g of a solution at 37% by weight of formaldehyde, and, with stirring, 26.7 g of intermediate (XXI) and 16.4 g of 2,4,6-triamino-1,3,5-triazine (melamine) are added to the same reactor of 0.5 liter of capacity as in Example 1.

The resulting mixture is kept heated at 65° C. for a 45 minute time, until a good dispersion is obtained.

Such a dispersion, kept at 65° C., is fed, during approximately 30 minutes, to the same 1 liter reactor as disclosed hereinabove, containing the suspension constituted by 110 g of ammonium polyphosphate (Exolit 422®) in 140 cm³ of water and 140 cm³ of methanol, heated at 65° C.

The resulting mixture is heated up to boiling temperature and is kept refluxing for 12 hours.

The reaction mixture is allowed to cool down to room temperature, and the resulting product is filtered off, and the filter cake is washed on the same filter with a water-methanol mixture.

Then, by operating according to the same operating modalities as disclosed in Example 1, 152.3 g of a white crystalline product are obtained, which contains 21.9 percent of phosphorus, corresponding to a content of 69.7% by weight of ammonium polyphosphate.

The resulting product corresponds hence to ammonium polyphosphate microencapsulated with resin in the microencapsulation ratio of 2.3:1.

The solubility of ammonium polyphosphate in water at 60° C. is of 7.2% by weight.

EXAMPLE 3

184.5 g of cyanuric chloride and 800 cm³ of acetone are charged to a reactor of 3 liters of capacity, equipped with stirrer, thermometer, dripping funnel, reflux condenser and heating bath.

With stirring, the reaction mixture is heated up to 40° C. in order to obtain a solution, then 284 g of an aqueous solution of ammonia at 30% by weight are added during a 1 hour and 30 minute time.

The reaction mixture is subsequently heated up to 45° C. and is kept 4 hours at this temperature.

After cooling, the resulting product is filtered off and is washed on the filter with water.

After oven drying at 50°–60° C. under vacuum, 113 g of intermediate (IV):

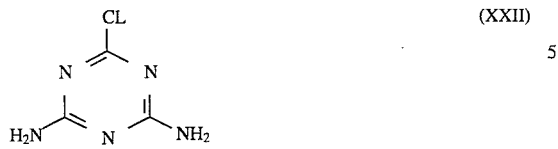
(XXII)

are obtained as a white, infusible, crystalline powder containing 24.2% of chlorine (theoretical chlorine content= 24.4%).

400 cm³ of xylene, 58.2 g of intermediate (XXII) and 17.2 g of piperazine are charged to a reactor of 1 liter of capacity, fitted as the preceding one.

The reaction mass is heated up to 100° C., and is kept 2 hours at this temperature.

Then, 16 g of sodium hydroxide in solid state is added and the resulting mixture is heated up to boiling temperature.

The reaction mixture is allowed to reflux for approximately 20 hours, then is cooled down to room temperature and is filtered.

The filter cake is washed with plentiful water and is dried. 54.2 g of intermediate (XXIII):

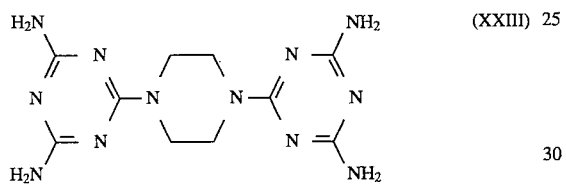
(XXIII)

are obtained as a white crystalline powder having m.p. higher than 300° C.

The structure of compounds (XXII) and (XXIII) was confirmed by I.R. spectroscopic analysis.

100 cm³ of water, 150 cm³ of methanol, 81.2 g of a solution at 37% by weight of formaldehyde and, with stirring, 30.4 g of intermediate (XXIII) are charged to the same reactor of 0.5 liter of Example 1.

The reaction mass is heated up to 70° C. for 1 hour then, while keeping the reaction temperature at 70° C., and during a 1 hour time, the resulting dispersion is charged to the 1 liter reactor of Example 1, containing the dispersion constituted by 90 g of ammonium polyphosphate (Exolit 422®) in 100 cm³ of water and 100 cm³ of methanol, heated at 70° C.

The reaction is heated up to boiling temperature and is kept refluxing for 8 hours.

Then, by proceeding according to such operating modalities as disclosed in Example 1, 127.1 g of a white crystalline product are obtained which contains 21.7 percent of phosphorus, corresponding to a content of 69.1 percent by weight of ammonium polyphosphate.

The resulting product corresponds hence to an ammonium polyphosphate microencapsulated with resin in the ratio of 2.23:1 by weight.

The solubility of ammonium polyphosphate in water at 60° C. is of 5.5% by weight.

EXAMPLE 4

400 cm³ of water, 72.8 g of intermediate (XXII) and 15.0 g of ethylenediamine are charged to a reactor of 1 liter of capacity, equipped as in the preceding example.

The reaction mass is heated up to 95° C. and is kept at that temperature for 1 hour, then, during 3 hours, 20.0 g of sodium hydroxide in 100 cm³ of water are added.

The reaction mixture is heated up to boiling temperature and is kept refluxing for approximately 10 hours.

The reaction mixture is allowed to cool down to 40° C. and the resulting product is filtered off, and the filter cake is washed on the same filter with water at 40° C.

By drying the filter cake in an oven at 100° C., 66.2 g of intermediate (XXIV):

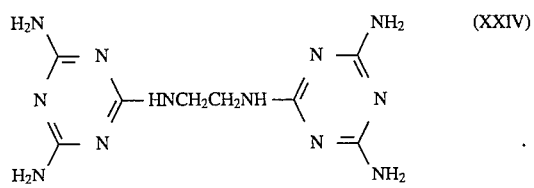
(XXIV)

are obtained as a white crystalline powder having a melting point higher than 300° C.

The structure of intermediate (XXIV) was furthermore confirmed by I.R. spectroscopic analysis.

To the same reactor of 0.5 liter of capacity of the preceding examples, 150 cm³ of water, 150 cm³ of methanol, 18.0 g of paraformaldehyde and, with stirring, 27.8 g of intermediate (XXIV) are added.

The reaction mass is heated up to 65° C. and is kept at that temperature for 1 hour, until a good dispersion is obtained.

Such a dispersion, kept at 65° C., is fed, during an approximate 1 hour time to the same reactor of 1 liter, containing the dispersion constituted by 90.0 g of polyphosphate (Exolit 422®) in 100 cm³ of water and 100 cm³ of methanol, kept heated at 65° C.

The reaction is heated up to boiling temperature and is kept refluxing for 9 hours.

Then, by proceeding according to the same operating modalities as disclosed in the above examples, 121.4 g are obtained of a white crystalline product which contains 22.8% of phosphorus, corresponding to a content of 72.6% by weight of ammonium polyphosphate.

Therefore, the obtained product corresponds to ammonium polyphosphate microencapsulated with resin in the ratio of 2.64:1 by weight.

The solubility of ammonium polyphosphate in water at 60° C. is of 5.2%.

EXAMPLE 5

400 cm³ of water, 86.2 g of intermediate (XX) and 20.6 g of diethylene triamine are charged to the same reaction equipment of 1 liter of capacity of the preceding example.

The reaction mass is heated up to 80° C. for 2 hours, then 16 g of sodium hydroxide dissolved in 30 cm³ of water are added, and the reaction mixture is heated up to boiling temperature.

The reaction mixture is kept refluxing for approximately 14 hours, then, by proceeding as disclosed in Example 2, 86.2 g of intermediate (XXV):

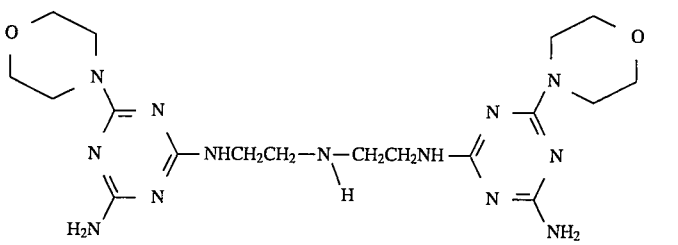 (XXV)

are obtained as a white crystalline powder with m.p.= 198°–201° C.

The structure of intermediate (XXV) was further confirmed by I.R. spectroscopic analysis.

130 cm³ of methanol, 100 cm³ of water, 53.0 g of a solution at 37% of formaldehyde by weight and, with stirring, 27.7 g of intermediate (XXV) and 13.0 g of melamine are charged to the same reactor of 0.5 liter of the preceding examples.

The reaction mass is heated up to 65° C. and is kept at that temperature for 1 hour, then the dispersion, kept at 65° C., is fed, within a 1 hour time, to the same reactor of 1 liter of capacity containing the dispersion, heated at 65° C., constituted by 90.0 g of ammonium polyphosphate (Exolit 422$^{(R)}$) in 150 cm³ of water and 150 cm³ of methanol.

The reaction mixture is heated up to boiling temperature and is kept refluxing for 10 hours.

By subsequently proceeding according to the same operating modalities as of the preceding examples, 130.6 g of a white crystalline product are obtained which contains 21.2 percent of phosphorus, corresponding to a content of 67.5% of ammonium polyphosphate by weight.

The obtained product corresponds hence to ammonium polyphosphate microencapsulated with resin in the ratio of 2.08:1 by weight.

The solubility of ammonium polyphosphate in water at 60° C. is of 8.1 percent.

EXAMPLE 6

184.5 g of cyanuric chloride and 700 cm³ of water are charged to a reactor of 2 liters of capacity, fitted as in Example 1.

While cooling from the outside, 133 g of bis (2-methoxyethyl) amine and 40 g of sodium hydroxide dissolved in 150 cm³ of water are fed simultaneously during a 3 hour time, with the pH value of the mixture being kept comprised within the range of from 5 to 7, and the temperature being kept comprised within the range of from 0° to 3° C.

The reaction mixture is kept at the temperature of 0°–3° C. for a further 2 hours, then the resulting product is filtered off and is washed on the filter with cold water.

By drying the filter cake in an oven at 50° C., under vacuum, 254.3 g of intermediate (XXVI):

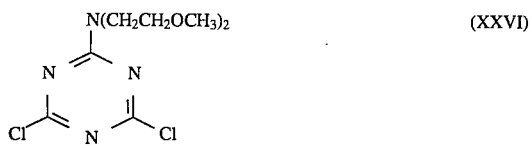 (XXVI)

are obtained as a white crystalline powder with m.p. =63°–65° C., and a chlorine content of 25.06% (theoretical chlorine content: 25.27%).

200 g of a solution of ammonia at 30% by weight and 500 cm³ of water are charged to a reactor of 1 liter of capacity, fitted as in the preceding examples.

The reaction mixture heated up to 40° C. and then, during a 30 minute time, 168.6 g of intermediate (XXVI) is added, with the reaction temperature being kept at 40° C.

The reaction temperature is increased up to 45° C. and is kept at that value for approximately 6 hours.

At the end, the reaction is cooled down to the temperature of 10° C. and the resulting product is filtered off, with the filter cake being washed on the same filter with cold water.

By oven drying the filter cake, 139.4 g of intermediate (XXVII):

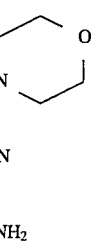 (XXVII)

are obtained as a white crystalline powder having m.p.= 87°–88° C. and containing 13.30 percent of chlorine (theoretical chlorine content: 13.57%).

The structure of intermediates (XXVI) and (XXVII) was furthermore confirmed by NMR analysis.

600 cm³ of xylene, 130.8 g of intermediate (XXVII) and 21.5 g of piperazine are charge to the same reactor of 1 liter of capacity.

The reaction mixture is heated up to 100° C. and is kept at that temperature for 2 hours. 20 g of sodium hydroxide are then added, and the reaction mixture is heated up to boiling temperature.

The reaction mass is kept under refluxing conditions for 24 hours, then is cooled down to room temperature, and the resulting product is filtered off and the filter cake is washed with plentiful water.

By oven drying at 100° C., 126.1 g of intermediate (XXVIII):

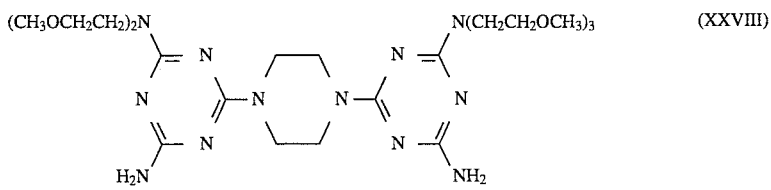

(XXVIII)

are obtained as a white crystalline powder with m.p. =168°–170° C.

The structure of intermediate (XXVIII) is furthermore confirmed by I.R. spectroscopic analysis.

100 cm³ of water, 150 cm³ of methanol, 0.5 g of sodium carbonate, 58.4 g of a solution of formaldehyde at 37 percent by weight and, with stirring, 21.4 g of intermediate (XXVIII) and 15.1 g of melamine are added to the same reactor of 0.5 liter of capacity as used in the preceding examples.

The reaction mass is heated at 70° C. for 1 hour, until a good dispersion is obtained.

Such a dispersion, kept at 70° C., is fed, during a 30 minute time, to the same 1 liter reactor as disclosed hereinabove, containing the suspension constituted by 90.0 g of ammonium polyphosphate [Phos-Check P/40®, with a phosphorus content of 31.5% ] 100 cm³ of water and 100 cm³ of methanol, heated at 70° C.

The reaction mixture is heated up to boiling temperature and is kept refluxing for 10 hours.

Then, by subsequently proceeding according to the same modalities as disclosed in the preceding examples, 127.6 g are obtained of a white crystalline product containing 21.6 percent of phosporous, corresponding to a content of 68.6 percent of ammonium polyphosphate by weight.

Therefore, the obtained product corresponds to ammonium polyphosphate microencapsulated with resin in the ratio of 2.18:1 by weight.

The solubility of ammonium polyphosphate in water at 60° C. of 7.7 percent by weight.

The solubility of Phos-Check P/40® in water at 60° C. is higher than 65% by weight.

EXAMPLES 7–12

By operating under analogous conditions to as disclosed in Examples from 1 to 6, the compounds are prepared which are reported in following table 2.

In such structures, $R_3$, when present, is replaced by the triazinic ring having the formula:

TABLE 2

Derivative of general formula (I)

$$\begin{array}{c} R_1 \\ R-N \\ \phantom{R-}N \diagup \phantom{X} \diagdown N-R_2 \\ \phantom{RR} \| \phantom{XXX} \| \\ \phantom{RRR} N \phantom{XX} N \\ \phantom{RRRR} \diagdown \phantom{X} \diagup \\ \phantom{RRRRR} \underset{|}{\text{C}} \\ \phantom{RRRRRR} Z \end{array}$$

$$-Z-\left[-N-Z_1-\atop {[Z_2]_a}\right]_b -N\underset{R_2}{\overset{H}{\phantom{|}}}$$

| EXAMPLE Nº | APP (*) | R—N—R$_1$ | R$_2$ | −Z−[−N−Z$_1$− [Z$_2$]$_a$]$_b$ | Parts by weight | Polyaminic derivative Designation | Parts by weight | Molar ratio amines/formaldehyde | Ratio by weight APP/resin | Solubility of APP at 60° C. g/100 g of water |
|---|---|---|---|---|---|---|---|---|---|---|
| 7 | a | (CH$_2$)$_2$OCH=CH$_2$ | H | 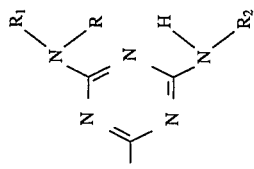 | 100 | — | — | 1:5.0 | 2.35:1 | 9.2 |
| 8 | a | H | H | —HN(CH$_2$)$_2$—N—(CH$_2$)$_2$NH— | 100 | — | — | 1:8.0 | 3.5:1 | 6.1 |
| 9 | b | H | H | | 82 | Ethyleneurea | 18 | 1:6.0 | 3.0:1 | 5.8 |
| 10 | a | H | H | —HN—[(CH$_2$)$_2$—N—(CH$_2$)$_2$NH—]$_3$ | 66 | Melamine | 34 | 1:6.5 | 2.1:1 | 8.6 |
| 11 | b | CH$_2$—CH=CH$_2$ | H | | 100 | — | — | 1:2.7 | 2.75:1 | 4.7 |
| 12 | a | H | H | | 100 | — | — | 1:4.2 | 4.45:1 | 3.4 |

TABLE 2-continued
Derivative of general formula (I)
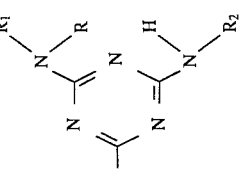
| EXAMPLE N° | APP (*) | R—N—R₁ | R₂ | Polyaminic derivative Parts by weight Designation | Parts by weight | Molar ratio amines/formaldehyde | Ratio by weight APP/resin | Solubility of APP at 60° C. g/100 g of water |
|---|---|---|---|---|---|---|---|---|
(*)a - Exolit 422 ®
b - Phos-CheckP/40 ®

EXAMPLE 13

72.0 g of isotactic polypropylene flakes, having a Melt Flow Index equal to 12 and containing 96% by weight of a fraction insolubles in n-heptane; 27.0 g of the product of Example 1;0.67 g of dilauryl thiopropionate and 0.33 g of pentaerythritol tetra [3-(3,5-di-tert-butyl-4-hydroxyphenyl) propionate] are blended and moulded on a MOORE platen press, by operating for 7 minutes at a pressure of 40 kg/cm$^2$.

Specimens are obtained as small slabs of approximately 3 mm of thickness, and on them the level of self-extinguishment is determined by measuring the limiting oxygen index (L.O.I. according to ASTM D-2863/77) on a STANTON REDCROFT instrument, and applying the "Vertical Burning TEST", which makes it possible the material to be classified at the three levels 94 V-0, 94 V-1 and 94 V-2 according to UL 94 standards (published by "Underwriters Laboratories" USA).

The following results are obtained:

L.O.I. =34.4

UL 94= Class V-0.

We claim:

1. A composite consisting essentially of ammonium polyphosphate having the formula (I):

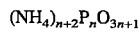

wherein n is an integer of from 2 to 800, microencapsulated with 10–80% by weight of a resin obtained by:
  (i) polymerizing with aldehydes a mixture comprising:
    (a) from 0 to 50 parts by weight of one or more polyaminic derivatives selected from the group consisting of urea, ethylene urea, thiourea, ethylene thiourea, propylene urea, melamine, acetoguanamine, propionoguanamine, butyroguanamine, isobutyroguanamine, caprinoguanamine, succinoguanamine, benzoguanamine, metamethylbenzoguanamine, benzylguanamine, hydantoin, piperazine-2, 5-dione, and barbituric acid;
    (b) from 50–100 parts by weight of one or more derivatives of 2,4,6-triamino-1,3,5-triazine having the formula (II):

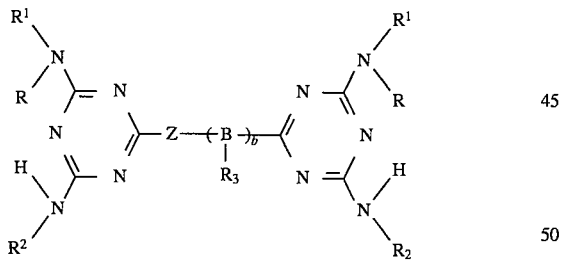

wherein the radicals from R to $R_2$, which may be the same or different, and which may have different meanings on each triazinic ring, are selected from the group consisting of hydrogen, $C_1$–$C_{18}$ alkyl, $C_2$–$C_8$ alkenyl, $C_6$–$C_{16}$ alkylcycloalkyl, hydroxy-substituted $C_6$–$C_{16}$ alkylcycloalkyl, $C_1$–$C_4$ hydroxyalkyl-substituted $C_6$–$C_{16}$ alkylcycloalkyl, $C_1$–$C_4$ hydroxyalkyl-substituted $C_6$–$C_{16}$ alkylcycloalkyl, —CH$_2$—(C$_m$H$_{2m}$)—O—R$_4$, and —CH$_2$—(C$_p$H$_{2p}$)—N (R$_5$)$_2$ wherein:

m=an integer comprised within the range of from 1 to 7;

p=an integer comprised within the range of from 1 to 5;

$R_4$ is selected from the group consisting of hydrogen, $C_1$–$C_8$ alkyl, $C_2$–$C_6$ alkenyl, and —(C$_q$H$_{2q}$)—O—R$_6$ wherein q is an integer of from 1 to 4 and $R_6$ is selected from the group consisting of hydrogen, $C_1$–$C_4$ alkyl, $C_6$–$C_{12}$ cycloalkyl, and $C_6$–$C_{12}$ alkylcycloalkyl;

the radicals $R_5$, which may be the same or different, are selected from the group consisting of hydrogen, $C_1$–$C_8$ alkyl, $C_2$–$C_6$ alkenyl, $C_6$–$C_{12}$ cycloalkyl or alkylcycloalkyl, and $C_1$–$C_4$ hydroxyalkyl;

or the moiety

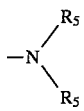

is replaced by a heterocyclic radical linked to the alkyl chain through the nitrogen atom, and optionally containing another hetero atom;

or in formula (II) the moiety

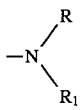

is replaced by a heterocyclic radical linked to the triazinic ring through the nitrogen atom, and optionally containing another hetero atom;

a is 0 or 1;

b is 0 or an integer of from 1 to 5;

$R_3$ is hydrogen or

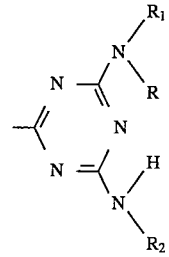

and its meaning may vary within each repeating unit;

when b is 0, Z is a divalent radical selected from the group consisting of

wherein the radicals $R_7$, which are the same or different, are hydrogen or $C_1$–$C_4$ alkyl;

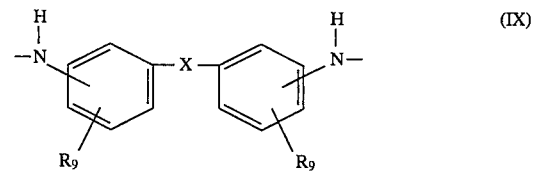

wherein X is a single carbon-carbon bond, an oxygen atom, a sulfur atom, a sulfur-sulfur bond, SO, $SO_2$, NH, $NHSO_2$, NHCO, N=N or $CH_2$'

$R_9$ is hydrogen, hydroxy, $C_1$–$C_4$ alkoxy, or

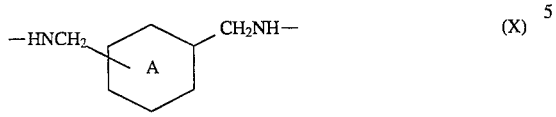            (X)

wherein A may be a saturated or unsaturated ring; and

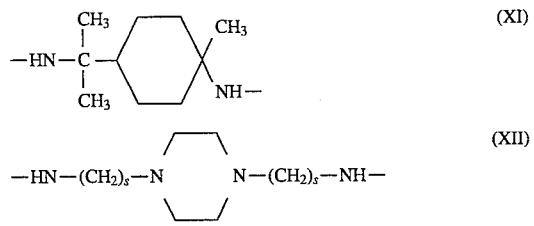

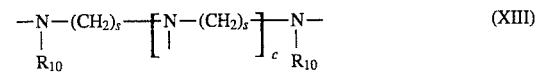            (XII)

wherein s is an integer of from 2 to 5;
when b is an integer of from 1 to 5, the

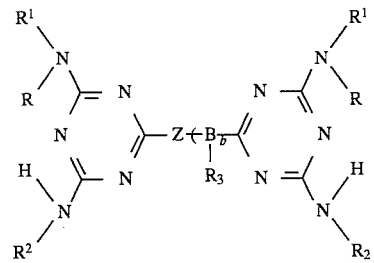

is a multivalent moiety selected from the group consisting of

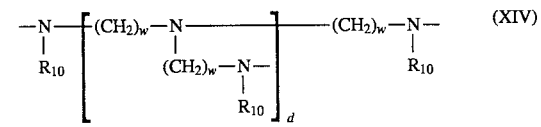           (XIII)

wherein $R_{10}$ is hydrogen or $C_1$–$C_4$ alkyl;
c is an integer within the range of from 1 to 5; s, which are the same or different from each other, have the same meaning as defined above: and $$-N-\left[(CH_2)_w-N-\atop{|\atop R_{10}}\ \atop{(CH_2)_w-N-\atop{|\atop R_{10}}}\right]_d-(CH_2)_w-N-\atop{|\atop R_{10}} \quad (XIV)$$

wherein $R_{10}$ has the same meaning as defined above, w is an integer of from 2 to 4, d is either 1 or 2; and (ii) causing the resulting product to turn into a resin by acidifying at a pH of from 1 to 5;
and wherein said aldehyde is formaldehyde or a mixture containing formaldehyde and up to 20% by mole another aldehyde with general formula (XI): $R_{11}$—CHO, where $R_{11}$ is a $C_1$–$C_8$ alkyl; a $C_2$–$C_6$ alkenyl; a $C_6$–$C_{12}$ aryl.

2. Composite according to claim 1, wherein the aldehyde is formaldehyde.

3. Composite of claim 1, in which the moiety:

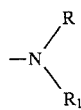

in general formula (II) is replaced by heterocyclic radicals selected from:

aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5diethylpiperazine.

4. Composite of claim 1, in which the moiety:

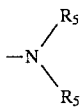

is replaced by a heterocyclic radical selected from: aziridine; pyrrolidine; piperidine; morpholine; thiomorpholine; piperazine; 4-methylpiperazine; 4-ethylpiperazine.

5. Process for preparing the composite constituted by microencapsulated ammonium polyphosphate according to claim 1, comprising:

(i) reacting, in solution, the triazinic derivative having the general formula (II), either mixed or not mixed with the polyaminic derivative, with aldehydes;

(ii) causing the resulting reaction product to turn into a resin form, by adding the dispersion (i) to a dispersion of ammonium polyphosphate having the general formula (I), having a pH value comprised within the range of from 1 to 5.

6. Process according to claim 5, in which the reaction (i) is carried out with a molar ratio of triazinic derivative having general formula (II), or its mixture with said polyaminic derivative, to the aldehydes, comprised within the range of from 1:1 to 1:12.

7. Process according to claim 6, in which the reaction (i) is carried out at temperatures comprised within the range of from 20° C. to the boiling point of the solvent used, and the reaction (ii), of resinification and microencapsulation, is carried out at a temperature comprised within the range of from 40° C. to 150° C.

8. Process according to claim 7, in which the reactions of steps (i) and (ii) are carried out in one single step at a temperature higher than 40° C.

9. A composite consisting essentially of ammonium polyphosphate having the formula (I):

$(NH_4)_{n+2}P_nO_{3n+1}$ wherein n is an integer of from 2 to 800, microencapsulated with 10–80% by weight of a resin obtained by: (i) polymerizing with aldehydes a mixture comprising:

(a) from 0 to 50 parts by weight of one or more polyaminic derivatives selected from the group consisting of urea, ethylene urea, thiourea, ethylene thiourea, propylene urea, melamine, acetoguanamine, propionoguanamine, butyroguanamine, isobutyroguanamine, caprinoguanamine, succinoguanamine, benzoguanamine, metamethylbenzoguanamine, benzylguanamine, hydantoin, piperazine-2, 5-dione, and barbituric acid;

(b) from 50–100 parts by weight of one or more derivatives of 2,4,6-triamino-1,3,5-triazine having the formula (II):

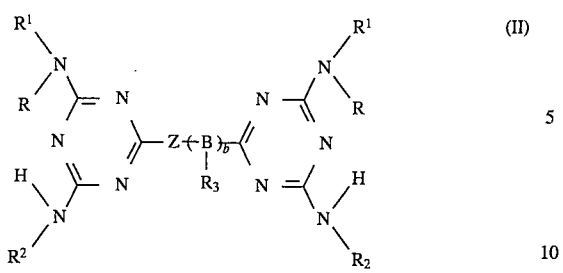

wherein the radicals from R to $R_2$, which may be the same or different, and which may have different meanings on each triazinic ring, are selected from the group consisting of hydrogen, $C_1$–$C_{18}$ alkyl, $C_2$–$C_8$ alkenyl, $C_6$–$C_{16}$ alkylcycloalkyl, hydroxy-substituted $C_6$–$C_{16}$ alkylcycloalkyl, $C_1$–$C_4$ hydroxyalkyl-substituted $C_6$–$C_{16}$ alkylcycloalkyl, $C_1$–$C_4$ hydroxyalkyl-substituted $C_6$–$C_{16}$ alkylcycloalkyl, —$CH_2$—($C_mH_{2m}$)—O—$R_4$, and —$CH_2$—($C_pH_{2p}$)—N $(R_5)_2$ wherein:

m=an integer comprised within the range of from 1 to 7;
p=an integer comprised within the range of from 1 to 5;
$R_4$ is selected from the group consisting of hydrogen, $C_1$–$C_8$ alkyl, $C_2$–$C_6$ alkenyl, and —$(C_qH_{2q})$—O—$R_6$
wherein q is an integer of from 1 to 4 and $R_6$ is selected from the group consisting of hydrogen, $C_1$–$C_4$ alkyl, $C_6$–$C_{12}$ cycloalkyl, and $C_6$–$C_{12}$ alkylcycloalkyl;
the radicals $R_5$, which may be the same or different, are selected from the group consisting of hydrogen, $C_1$–$C_8$ alkyl, $C_2$–$C_6$ alkenyl, $C_6$–$C_{12}$ cycloalkyl or alkylcycloalkyl, and $C_1$–$C_4$ hydroxyalkyl;
or the moiety

is replaced by a heterocyclic radical linked to the alkyl chain through the nitrogen atom, and optionally containing another hetero atom;
or in formula (II) the moiety

is replaced by a heterocyclic radical linked to the triazinic ring through the nitrogen atom, and optionally containing another hetero atom;
a is 0 or 1;
b is 0 or an integer of from 1 to 5;

$R_3$ is hydrogen or

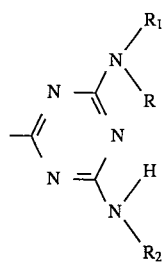

and its meaning may vary within each repeating unit;
when b is 0, Z is a divalent radical selected from the group consisting of

  (IV)

  (V)

wherein r is an integer of from 2 to 14, $R_8$ is hydrogen, $C_1$–$C_4$ alkyl, $C_2$–$C_6$ alkenyl, or $C_1$–$C_4$ hydroxyalkyl;

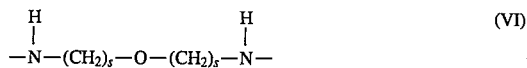  (VI)

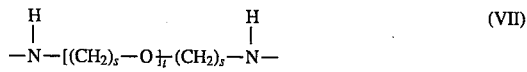  (VII)

wherein s is integer of from 2 to 5 and t is an integer of from 1 to 3;
when b is an integer of from 1 to 5, Z is 0 and B. is a multivalent moiety selected from the group consisting of

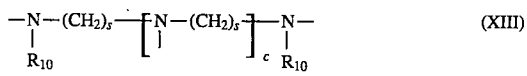  (XIII)

wherein $R_{10}$ is hydrogen or $C_1$–$C_4$ alkyl;
c is an integer within the range of from 1 to 5; s, which are the same or different from each other, have the same meaning as defined above: and

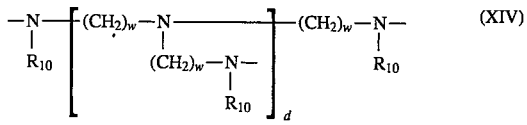  (XIV)

wherein $R_{10}$ has the same meaning as defined above, w is an integer of from 2 to 4, d is either 1 or 2; and
(ii) causing the resulting product to turn into a resin by acidifying at a pH of from 1 to 5.

* * * * *